(No Model.)

J. TAINI.
NUT LOCK.

No. 509,700. Patented Nov. 28, 1893.

Witnesses
Roy L Whitcomb
B. F. Thornett

Inventor
John Taini
By Evert & Appleman
Attorneys

UNITED STATES PATENT OFFICE.

JOHN TAINI, OF DEL RIO, TEXAS.

NUT-LOCK.

SPECIFICATION forming part of Letters Patent No. 509,700, dated November 28, 1893.

Application filed August 14, 1893. Serial No. 483,093. (No model.)

*To all whom it may concern:*

Be it known that I, JOHN TAINI, a citizen of the United States of America, residing at Del Rio, in the county of Val Verde and State of Texas, have invented certain new and useful Improvements in Nut-Locks, of which the following is a specification, reference being had to the accompanying drawings.

This invention relates to certain new and useful improvements in nut locks, and especially to that class where the bolt forms and locking device are integral.

This invention has for its object the novel provision of means whereby a nut may be securely locked on a screw-threaded bolt, and at the same time be readily unlocked if desired; furthermore, the construction of a nut lock that will be strong, durable and comparatively inexpensive to manufacture, avoiding the employment of additional parts thus reducing the same to the simplest possible construction.

The invention finally consists in the novel details of construction, arrangement and combination of parts to be hereinafter more fully described and specifically pointed out in the claims.

In describing the invention in detail, reference is had to the accompanying drawings forming a part of this specification and wherein like numerals of reference indicate corresponding parts throughout the several views, in which—

Figure 1:
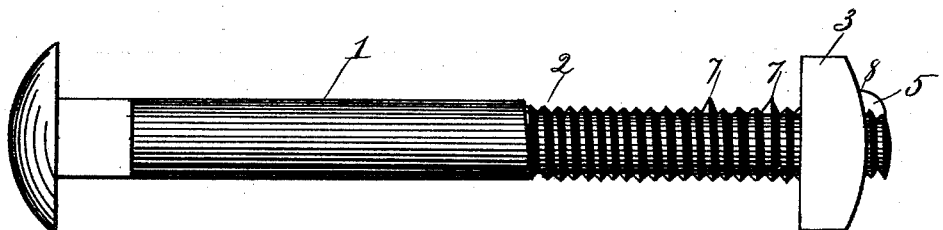
Figure 2:
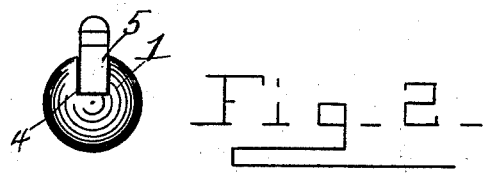
Figure 3:
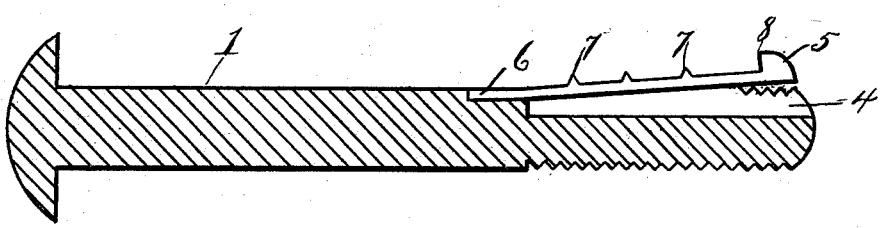

Figure 1, is a side view of my improved nut lock showing the nut applied. Fig. 2, is a detail view of the bolt. Fig. 3, is a longitudinal vertical sectional view of the bolt.

In these drawings, 1, indicates the bolt, provided with screw threads 2; the nut being indicated by 3; 4, the longitudinal groove in the bolt into which the spring tongue 5, is seated, said spring tongue being attached at 6, by welding or in any other suitable manner. This spring tongue is provided on its face with a series of transverse lugs or projections 7, 7, and at its free end with a shoulder 8.

The bolt and nut are of the ordinary and well known construction provided with male and female screw threads respectively. The groove is then formed in the bolt and the spring secured in proper position in such manner that it will embed itself in the groove while the nut is in position on the bolt, and when the nut is not in engagement therewith, the said spring tongue will project above the level of the screw threads as shown in Fig. 3, of the drawings. The transverse lugs are formed on the spring tongue at intervals and coincide with the screw threaded portion of the nut. By reason of the resiliency of the spring tongue, the lugs of the same are automatically pressed more firmly against the nut, and as each is reached in its turn, the friction is increased until the nut is brought into contact with the shoulder where it abuts and is securely held in position against further movement until a direct pressure is brought to bear on the spring tongue to such an extent, as to depress the same in alignment with the screw threads, when the nut can be readily removed. The end of the spring tongue is slightly beveled and when depressed, conforms with the end of the bolt, in order to allow the nut to be readily applied to the bolt.

It will be obvious that the nut is held in any desired position on the bolt by means of the lugs, but if by wear or other cause these should fail to operate, the end sought viz., the prevention of accidents by the disengagement of the nut will yet avail, as the shoulder will perform its function and thus the desired result will be accomplished.

It will be particularly noted and understood that various changes may be made in the construction of this device without materially departing from the general idea involved.

Having fully described my invention, what I claim as new, and desire to secure by Letters Patent, is—

1. In a nut lock, the combination of a bolt having a spring tongue, said spring tongue having formed on its free end a shoulder and a series of lugs, said lugs corresponding at intervals with the thread on the bolt and a nut of the ordinary construction, substantially as described.

2. In a nut lock, the combination of a bolt having a slot and a spring tongue carrying on its free ends a shoulder and a series of lugs, said lugs to correspond at intervals with the thread of the bolt, and a nut substantially as described.

3. In a lock nut, the combination of a bolt having a longitudinal slot; a spring tongue provided with a series of lugs and a shoulder, so that when said spring is depressed the lugs will form a portion of the screw thread on the bolt, and the shoulder to correspond with the end of the bolt, all parts being arranged and operating substantially as described and for the purpose set forth.

In testimony whereof I affix my signature in presence of two witnesses.

JOHN TAINI.

Witnesses:
G. W. BROWN,
G. B. CASSINELLI.